United States Patent [19]

Bruning

[11] Patent Number: 5,487,368
[45] Date of Patent: Jan. 30, 1996

[54] COMBUSTION GAS SEAL ASSEMBLY ADAPTED FOR A FUEL INJECTOR

[75] Inventor: E. Eugene Bruning, Normal, Ill.

[73] Assignee: Caterpillar Inc., Peoria, Ill.

[21] Appl. No.: 282,942

[22] Filed: Jul. 29, 1994

[51] Int. Cl.$^6$ ................................................ F02M 55/02
[52] U.S. Cl. ............................................................. 123/470
[58] Field of Search .................................. 123/468, 469, 123/470, 294; 239/600

[56] References Cited

U.S. PATENT DOCUMENTS

| | | | |
|---|---|---|---|
| 2,080,189 | 5/1937 | Schwaiger | 123/294 |
| 3,334,617 | 8/1967 | Palkowsky | 123/470 |
| 3,845,748 | 11/1974 | Eisenberg | 123/469 |
| 4,104,992 | 8/1978 | Fricker . | |
| 4,133,321 | 1/1979 | Hofmann et al. | 123/470 |
| 4,519,371 | 5/1985 | Nagase et al. | 123/470 |
| 4,528,959 | 7/1985 | Hauser, Jr. | 123/470 |
| 4,545,354 | 10/1985 | Jaggie et al. | 123/470 |
| 4,589,596 | 5/1986 | Stumpp et al. | 239/397.5 |
| 4,647,012 | 3/1987 | Gartner | 123/470 |
| 4,677,958 | 7/1987 | Gayler | 123/585 |
| 5,024,193 | 6/1991 | Graze, Jr. | 123/293 |
| 5,044,340 | 9/1991 | Robnett | 123/470 |
| 5,129,658 | 7/1992 | Berton et al. | 277/37 |
| 5,191,871 | 3/1993 | Liskow | 123/468 |
| 5,297,523 | 3/1994 | Hafner et al. | 123/456 |
| 5,345,913 | 9/1994 | Belshaw et al. | 123/470 |

*Primary Examiner*—Thomas N. Moulis
*Attorney, Agent, or Firm*—Anthony N. Woloch; Mark D. Becker

[57] ABSTRACT

A combustion gas seal assembly adapted for a fuel injector installed in a cylinder head of an engine. The seal assembly includes a hollow adapter adapted to be connected to the cylinder head, an injector case positioned in the adapter, and a flexible annular seal positioned between the case and the adapter. The case and adapter each define opposed annular seat portions contacting one another. At least one of the seat portions of the case and the adapter defines an annular groove in which the flexible annular seal is positioned. The combustion gas seal assembly prevents pressurized combustion gas, originating from an engine combustion chamber, from leaking past the interface between the case and the cylinder head. The assembly also facilitates low cost retrofitting or adaptation of new or different fuel injectors to an existing cylinder head of a conventional engine.

16 Claims, 2 Drawing Sheets

5,487,368

COMBUSTION GAS SEAL ASSEMBLY ADAPTED FOR A FUEL INJECTOR

TECHNICAL FIELD

The present invention relates generally to fuel injectors and, more particularly to a combustion gas seal between the injector and an engine cylinder head.

BACKGROUND ART

A typical installation of a fuel injector is shown, for example, in U.S. Pat. No. 5,297,523 issued to Hafner et al. on Mar. 29, 1994. The injector is positioned in a bore of an engine cylinder head and is connected to the cylinder head by a clamp.

It is desirable to provide a low cost seal for preventing high pressure combustion gases, originating from an engine combustion chamber, from leaking past the interface between the injector and the cylinder head bore. It is also desirable to facilitate low cost adaptation of new or different fuel injectors to an existing cylinder head of an engine. Other known ways of installing a fuel injector in a cylinder head are individually shown in U.S. Pat. No. 4,104,992 issued to Fricker on Aug. 8, 1978, U.S. Pat. No. 4,519,371 issued to Nagase et al. on May 28, 1985, U.S. Pat. No. 4,589,596 issued to Stumpp et al. on May 20, 1986, U.S. Pat. No. 4,677,958 issued to Gayler on Jul. 7, 1987, U.S. Pat. No. 5,044,340 issued to Robnett on Sep. 3, 1991, and U.S. Pat. No. 5,129,658 issued to Berton et al. on Jul. 14, 1992.

The present invention is directed to overcoming one or more of the problems as set forth above.

DISCLOSURE OF THE INVENTION

In one aspect of the present invention a combustion gas seal assembly is disclosed which is adapted for a fuel injector installed in a cylinder head of an engine. The seal assembly includes an engine member, an injector case positioned in the engine member, and a flexible annular seal positioned between the case and the engine member. The case and engine member each define opposed seat portions contacting one another. At least one of the seat portions of the case and the engine member defines an annular groove in which the flexible annular seal is positioned.

In another aspect of the present invention a nozzle portion of a fuel injector is disclosed. The nozzle portion comprises a nozzle case having a frustoconical seat portion adapted to seat against an engine member such as an adapter or an engine cylinder head. The seat portion of the case defines an annular groove adapted to receive a flexible annular seal.

The combustion gas seal assembly prevents pressurized combustion gas, originating from an engine combustion chamber, from leaking past the interface between the injector case and the cylinder head. The combustion gas seal assembly also facilitates low cost retrofitting or adaptation of new or different fuel injectors to an existing cylinder head of an engine.

BEST MODE FOR CARRYING OUT THE INVENTION

Figure 1:
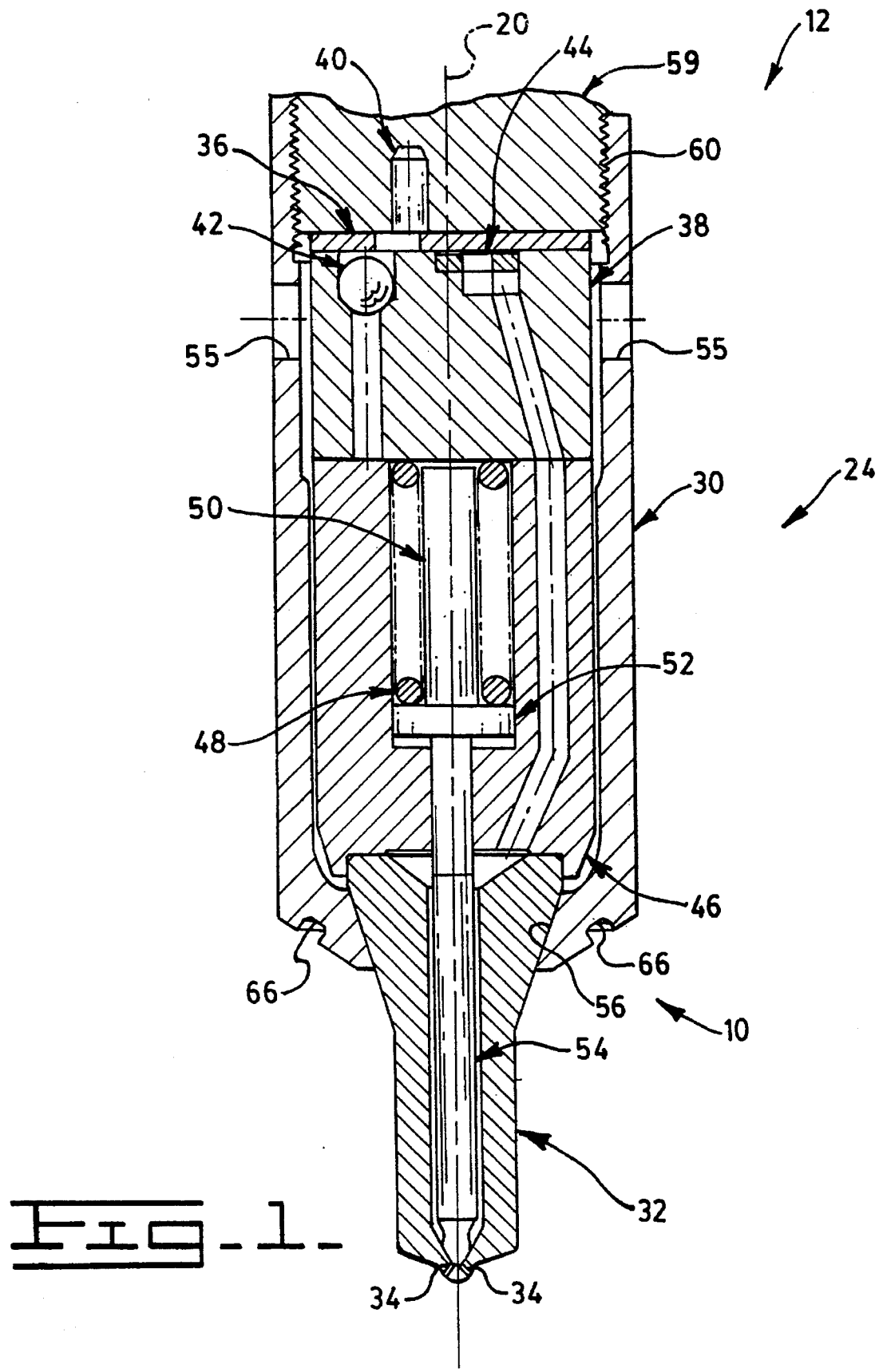
FIG. 1 is a diagrammatic partial cross-sectional view of one embodiment of an injector of the present invention.
Figure 2:
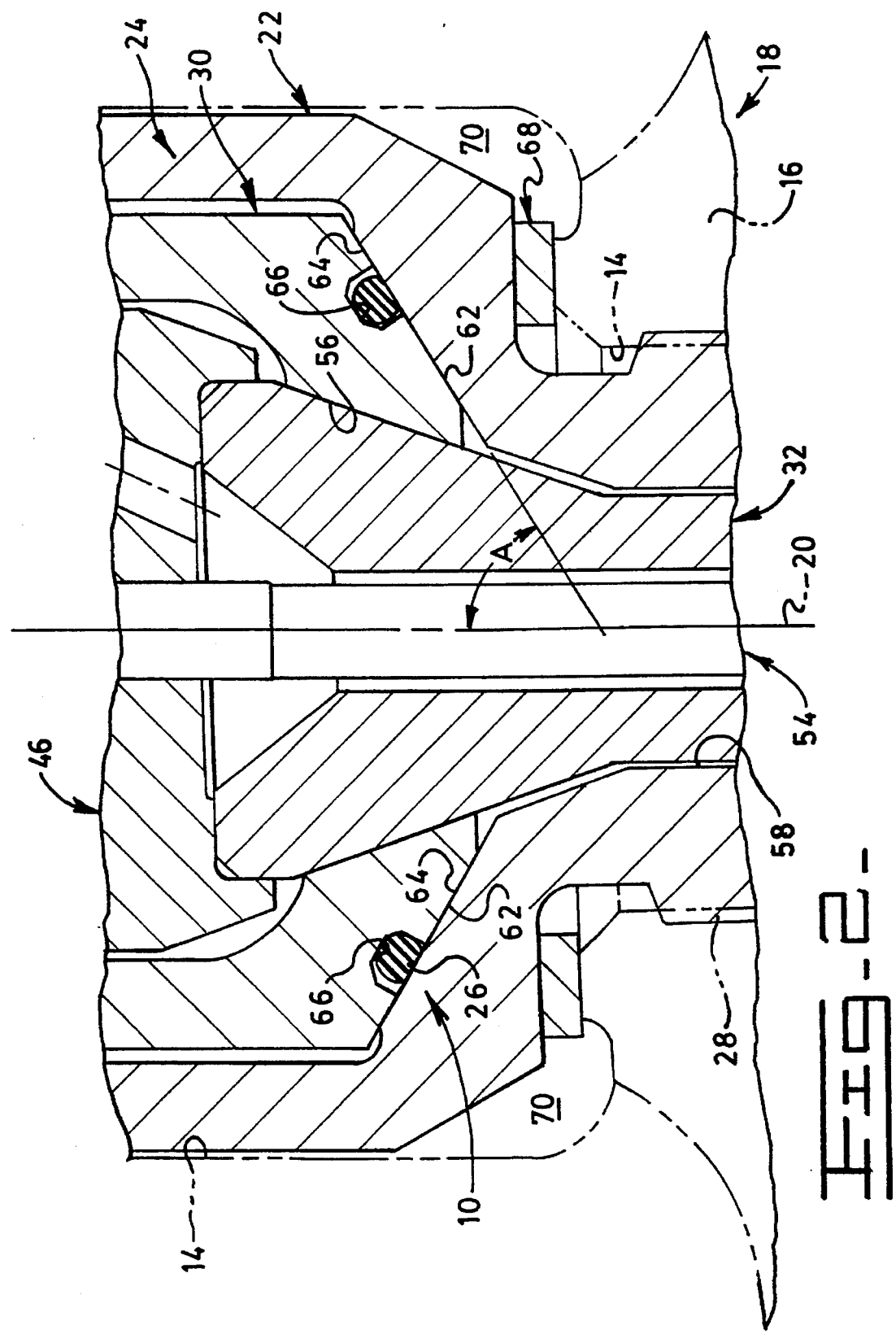
FIG. 2 is a diagrammatic enlarged partial view of the injector of FIG. 2 as installed in an exemplary internal combustion engine.

Referring to FIGS. 1–2 wherein similar reference numbers designate similar elements or features throughout the Figures, there is shown an exemplary embodiment of a combustion gas seal assembly 10 adapted for a direct-injection fuel injector 12 installed in an injector bore 14 defined by a cylinder head 16 of an internal combustion engine 18. For reference purposes, the injector 12 has a longitudinal axis 20. The injector 12 may, for example, be a unitized pump and injection nozzle. Alternatively, the injector 12 may be an injection nozzle adapted to be connected by a separate fuel line (not shown) to a high pressure fuel pump (not shown).

The combustion gas seal assembly 10 includes a hollow adapter or engine member 22, a nozzle portion 24 of the injector 12, and a flexible annular seal or sealing means 26. The adapter 22 is positioned in the injector bore 14 and is adapted to be connected to the cylinder head 16 by, for example, a threaded connection 28.

The nozzle portion 24 of the injector 12 is positioned in the adapter 22. The nozzle portion 24 includes a hollow case 30 and a nozzle spray tip 32 defining at least one fuel injection spray orifice 34. In the exemplary injector 12 shown in FIG. 1, the nozzle portion 24 of the injector 12 further includes a plate 36, a stop 38, at least one dowel 40, a fuel inlet ball check valve 42, a reverse flow check valve 44, a body 46, a check return spring or check biasing means 48, a check lift stop pin 50, a spacer 52, an axially movable inwardly-opening needle check 54. The case 30 defines at least one and preferably a plurality of fuel inlet passages 55. The case 30 and the adapter 22 each define a coaxial aperture 56,58 through which the nozzle spray tip 32 extends. The case 30 is adapted to be connected to a housing 59 of the injector 12 by, for example, a threaded connection 60.

The flexible annular seal 26 is sealedly positioned axially, as well as radially, between the case 30 and the adapter 22. Preferably, the flexible annular seal 26 is an o-ring seal formed from an elastomeric material. Preferably, the material is a flurocarbon elastomeric, such as Viton, which is resistant to continuous as well as intermittent high temperatures encountered during engine operation.

The case 30 and the adapter 22 each define opposed complementary annular seat portions 62,64 which contact one another. Alternatively, the case 30 may have an external frustoconical seat portion 62 adapted to seat directly against a complementary seat portion of another engine member such as the cylinder head 16 itself. Preferably the opposed annular seat portions 62,64 are frustoconically shaped to define a frustoconical surface having an included angle less than 180°. For example as shown in FIG. 2, the opposed annular seat portions 62,64 and the longitudinal axis 20 define an included angle A of about 60°.

At least one of the annular seat portions 62,64 of the case 30 and the adapter 22 defines an annular groove or recess 66. Preferably, the annular seat portion 62 of the case 30 solely defines the annular groove 66 for reduced cost and ease of assembly. The flexible annular seal 26 is snugly positioned around the case 30 in the annular groove 66 and is sealedly compressed by the opposed annular seat portions 62,64.

Preferably, for reduced manufacturing costs and ease of assembly, the combustion gas seal assembly 10 further includes a generally flat sealing washer or annular member 68. The sealing washer 68 is sealedly positioned axially between the adapter 22 and the cylinder head 16. Preferably, the sealing washer 68 is formed from a deformable metal such as a low carbon steel.

Industrial Applicability

To assemble the combustion gas seal assembly 10, the sealing washer 68 is positioned in the cylinder head bore 14. Then, the adapter 22 is positioned in the cylinder head bore 14 and threadedly connected to the cylinder head 16 at 28. The flexible annular seal 26 is positioned in the annular groove 66 and then the nozzle portion 24 of the injector 12 is positioned in the adapter 22. The injector 12 is secured to the cylinder head 16 by a removable clamp (not shown). Examples of suitable clamps are shown in the above-mentioned U.S. Pat. No. 5,297,523.

The combustion gas seal assembly 10 prevents pressurized combustion gas, originating from an engine combustion chamber (not shown), from leaking past the interface between the injector case 30 and the cylinder head 16. The combustion gas seal assembly 10 also facilitates low cost retrofitting or adaptation of new or different fuel injectors to an existing cylinder head of an engine. The geometry of the adapter 22 may be variably selected in order to accommodate new or different fuel injectors. For example, such new or different fuel injectors may be hydraulically-actuated injectors substituted for conventional mechanically-actuated injectors. The adapter 22 can also fluidly isolate or seal the injector 12 from one or more coolant passages 70 defined in the cylinder head 16.

Other aspects, objects, and advantages of this invention can be obtained from a study of the drawings, the disclosure, and the appended claims.

I claim:

1. A combustion gas seal assembly adapted for a fuel injector installed in an engine, said combustion gas seal assembly comprising:

an engine member;

a fuel injector, said fuel injector including a nozzle case and a nozzle tip portion, said nozzle case including an axial aperture through which said nozzle tip extends; and a flexible annular seal positioned between the nozzle case and the engine member, said nozzle case and engine member each defining opposed annular seat portions in contact with one another, at least one of the seat portions of the nozzle case and the engine member defining an annular groove, said flexible annular seal positioned in the annular groove and sealedly compressed by the opposed annular seat portions.

2. The combustion gas seal assembly of claim 1 wherein said opposed annular seat portions are frustoconically shaped.

3. The combustion gas seal assembly of claim 1 wherein said flexible annular seal is formed from an elastomeric material.

4. The combustion gas seal assembly of claim 1 wherein said flexible annular seal is formed from a flurocarbon elastomeric material.

5. A combustion gas seal assembly adapted for an internal combustion engine having a cylinder head defining an injector bore, said combustion gas seal comprising:

a hollow adapter positioned in the injector bore and adapted to be connected to the cylinder head;

a direct-injection fuel injector positioned in the adapter, said injector having a hollow case and a nozzle tip, said case and adapter each defining an aperture through which the nozzle tip extends; and a flexible o-ring seal positioned between the case and the adapter, said case and adapter each defining opposed complementary annular seat portions contacting one another, at least one of said seat portions of the case and the adapter defining an annular groove, said o-ring seal positioned in the annular groove and sealedly compressed by the annular seat portions.

6. The combustion gas seal assembly of claim 5 wherein said o-ring seal is formed from an elastomeric material.

7. The combustion gas seal assembly of claim 5 wherein said o-ring seal is formed from a flurocarbon elastomeric material.

8. The combustion gas seal assembly of claim 5 further including a sealing washer sealedly positioned between the adapter and the cylinder head.

9. The combustion gas seal assembly of claim 8 wherein said sealing washer is formed from a deformable metal.

10. The combustion gas seal assembly of claim 9 wherein said deformable metal is a low carbon steel.

11. The combustion gas seal assembly of claim 5 wherein said injector has a longitudinal axis, said opposed annular seat portions of the case and adapter defining a frustoconical surface having an included angle less than 180°.

12. The combustion gas seal assembly of claim 5 wherein said injector has a longitudinal axis, said opposed annular seat portions and the longitudinal axis defining an included angle of about 60°.

13. A fuel injector including a nozzle portion, said nozzle portion comprising a hollow case and a nozzle tip defining at least one fuel injection spray orifice, said case defining an aperture through which the nozzle tip extends, said case having an external frustoconical seat portion adapted to seat against another member, said seat portion of the case defining an annular groove adapted to receive a flexible annular combustion gas seal.

14. The nozzle portion of claim 13 wherein said flexible annular seal is formed from an elastomeric material.

15. The nozzle portion of claim 13 wherein said flexible annular seal is formed from a flurocarbon elastomeric material.

16. A nozzle portion adapted for a fuel injector, said nozzle portion comprising a hollow case and a nozzle tip defining at least one fuel injection spray orifice, and a flexible annular combustion gas seal, said case defining an aperture through which the nozzle tip extends, said case having an external frustoconical seat portion adapted to seat against another member, said seat portion of the case defining an annular groove, said flexible annular seal positioned in the annular groove.

* * * * *